United States Patent Office 3,562,207
Patented Feb. 9, 1971

3,562,207
POLYMERIC MATERIALS CONTAINING CAGED
BORON-NITROGEN COMPOUNDS
Jerome H. Ludwig, Cleveland, and Kenneth J. Witsken,
Cincinnati, Ohio, assignors to Emery Industries, Inc.,
Cincinnati, Ohio, a corporation of Ohio
No Drawing. Filed Feb. 23, 1968, Ser. No. 707,414
Int. Cl. C08f 45/60; C08g 51/60; C09k 3/16
U.S. Cl. 260—45.8
15 Claims

ABSTRACT OF THE DISCLOSURE

Polymeric materials treated with caged boron-nitrogen containing compounds are provided, along with a method for imparting improved properties to polymeric materials by treating them with caged boron-nitrogen containing compounds. The caged boron-nitrogen containing compounds are incorporated in or used to treat the surface of polyvinyl chloride, polyethylene, vinyl chloride-vinyl acetate copolymers, polyethylene terephthalate and the like. Examples of caged compounds used in this invention are 3,7,10-trimethyl-2,8,9-trioxa-5-aza-1-boratricyclo [3.3.3.0] undecane; 3 - hydroxymethyl - 7,10-dimethyl-2,8,9-trioxa-5 - aza - 1 - boratricyclo [3.3.3.0] undecane stearate; and 4,4,7,10-tetramethyl-2,8,9-trioxa-5-aza-1-boratricyclo [3.3.3.0] undecane.

BACKGROUND OF THE INVENTION

This invention relates to the incorporation of caged boron-nitrogen containing compounds into polymeric materials. More particularly, it relates to polymeric materials containing caged boron-nitrogen compounds and to a method for imparting improved properties, including antistatic properties to polymeric materials by adding to them caged boron-nitrogen compounds.

A common disadvantage of substrates made of natural or synthetic resins in either sheet or fiber form is that such substrates often tend to collect static electricity. Since such polymeric materials are usually electrical nonconductors, they do not effectively dissipate the electrical charges which have accumulated on them.

This accumulation of static electricity on fibers, filaments, films, sheets, and shaped articles made from synthetic or natural polymers is undesirable in that it presents problems in processing these materials to produce finished articles. The presence of static electricity in such articles is not only inherently bothersome, but it attracts dust and lint to the articles. Moreover, sheets and fabrics containing accumulated static electricity do not drape properly and have a tendency to cling in an unsightly and uncomfortable manner to adjacent articles.

As a result of these problems resulting from the accumulation of static electricity in polymeric materials, many attempts have been made to devise effective antistatic agents for addition to such materials. These antistatic agents have been incorporated into the polymeric products and also have been used in surface treatments of the polymeric products.

To be effective, antistatic agents should provide durable antistatic protection, have low toxicity, and be easy to apply or incorporate.

Although a number of antistatic agents which satisfy some or all of these desired properties to a greater or lesser extent have been heretofore proposed, a continuing search goes on for new agents which can be effectively used to impart antistatic properties to polymeric materials.

Accordingly, it is a primary object of the present invention to provide polymeric materials treated with caged boron-nitrogen containing compounds to impart improved properties thereto.

Another object of this invention is to provide natural or synthetic polymeric materials containing new and effective antistatic agents useful in preventing the build-up of undesirable charges of static electricity.

Another object of this invention is to provide a process for imparting antistatic properties to such polymeric materials.

Additional objects and advantages will be set forth in part in the description which follows and in part will be obvious from the description, or may be learned by practice of the invention, the objects and advantages being realized and attained by means of the compositions, methods, processes and improvements particularly pointed out in the appended claims.

DESCRIPTION OF THE INVENTION

To achieve the foregoing objects and in accordance with its purpose, this invention as employed and broadly described, provides a natural or synthetic polymeric material treated with one or more caged boron-nitrogen containing compounds. The caged boron-nitrogen containing compounds used in accordance with this invention have as bridgehead atoms nitrogen and boron which are capable of transannular interaction through a coordinate covalent bond formed by the lone pair of electrons on the nitrogen atom and the open sextet of electrons of the boron atom. The compounds are frequently referred to as triptychboroxazolidines because they contain boron and nitrogen and possess three separate rings.

The caged boron-nitrogen compounds used as polymer treatment agents in accordance with this invention conform to the general formula:

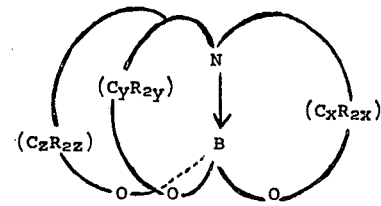

FORMULA I wherein $x$, $y$ and $z$ are the same or different integers of from 2 to 4 and indicate the number of carbon atoms forming the respective rings and the number of R substituents attached to said carbon atoms. The R substituent groups can be hydrogen; alkyl radicals containing from 1 to about 16 carbon atoms; cycloalkyl radicals containing from 3 to about 7 carbon atoms; alkenyl and cycloalkenyl radicals containing from 2 to about 7 carbon atoms; alkylnitriles; aryl radicals; hydroxy-substituted $C_1$ to about $C_6$ lower alkyl radicals; amino-substituted $C_1$ to about $C_6$ lower alkyl radicals; lower alkyl-substituted aryl radicals; aryl-substituted lower alkyl radicals; radicals of the formula: $R_nOC—R_m$ where $R_n$ is a lower alkylene radical containing 1 to about 6 carbon atoms and $R_m$ is an aliphatic radical (alkyl or alkenyl) having 1 to about 18 or more carbon atoms, or an aryl radical; and radicals of the formula: $R_nOR_p$ where $R_n$ is as defined above and $R_p$ is a $C_1$ to about $C_6$ lower aliphatic radical (alkyl or alkenyl) or an aryl radical.

Examples of various caged ring systems which conform to the above-noted general structural formula and are incorporated into polymeric materials in accordance with this invention are shown below in Formulas II through VI. The R substituents are the same as described above for general Formula I. Only a limited number of possible formulas are shown; however, it is to be understood caged compounds having any combination of 5, 6 and 7 member rings (wherein each of $x$, $y$ and $z$ of the basic formula is selected from the integers 2, 3 and 4) can be used. Mixtures of the various caged compounds also can be used.

It is also to be understood that the compounds described above include those where R substitutents on adjacent carbon atoms of the caged boron-nitrogen containing compounds of this invention are bonded together to form a cycloalkyl or cycloalkenyl radical. An example of such a

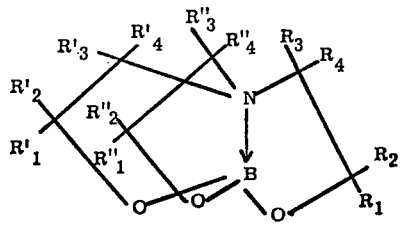

FORMULA II
Substituted 2,8,9-trioxa-5-aza-1-boratricyclo [3.3.3.0] undecanes ($x=2$, $y=2$, $z=2$)

FORMULA III
Substituted 2,9,10-trioxa-6-aza-1-boratricyclo [4.3.3.0] dodecanes ($x=3$, $y=2$, $z=2$)

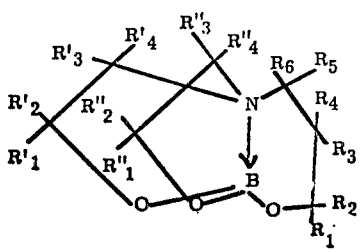

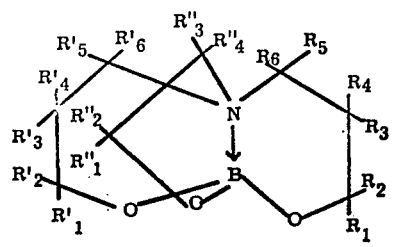

FORMULA IV
Substituted 2,10,11-trioxa-6-aza-1-boratricyclo [4.4.3.0] tridecanes ($x=3$, $y=3$, $z=2$)

FORMULA V
Substituted 2,10,11-trioxa-6-aza-1-boratricyclo [4.4.4.0] tetradecanes ($x=3$, $y=3$, $z=3$)

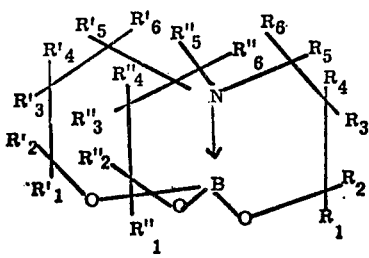

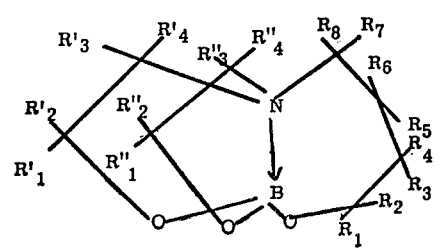

FORMULA VI
Substituted 2,10,11-trioxa-7-aza-1-boratricyclo [5.3.3.0] tridecanes ($x=4$, $y=2$, $z=2$)

compound in which a combination of R groups form a cyclic aliphatic group is:

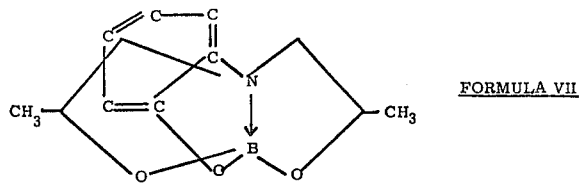

FORMULA VII

[11,14-dimethyl-2,12,13-trioxa-9-aza-1-boratetracyclo [7.3.3.0.0³,⁸]pentadeca-3,5,7-triene]

It is to be understood that the term "aryl radicals," as used herein to describe substituents of the rings of the caged boron-nitrogen compounds, is intended to include substituted aryl radicals such as hydroxy-, alkoxy-, nitro-, or cyano-substituted aryl radicals. For example, the caged boron-nitrogen additives of this invention include:

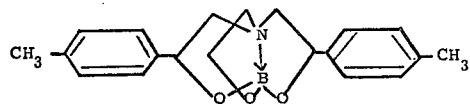

[3,7-bis(4-methylphenyl)-2,8,9-trioxa-5-aza-1-boratricyclo [3.3.3.0]undecane]

and

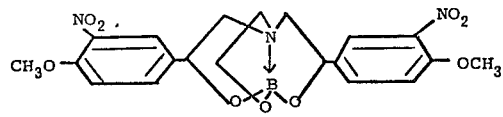

[3,7-bis(3-nitro-4-methoxyphenyl)-2,8,9-trioxa-5-aza-1-boratricyclo[3.3.3.0]undecane]

As pointed out above, the R substituents of the caged boron-nitrogen additives of this invention can also include ester, ether or amido radicals. Such radicals include

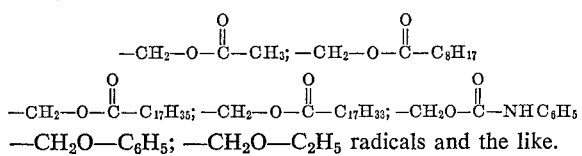

—CH₂O—C₆H₅; —CH₂O—C₂H₅ radicals and the like.

It is to be understood that when one or more of the R substituents in Formula I above are ester radicals of the formula

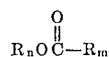

with $R_m$ being defined as an alkyl, alkenyl or aryl radical, this definition of $R_m$ is intended to include substituted radicals such as alkyl-, hydroxy-, amino-, amido- or cyano-substituted alkyl, alkenyl, and aryl radicals. For example, the additives can have the formulas:

In accordance with the preferred practice of the present invention, the caged boron-nitrogen containing compounds incorporated in polymeric materials have a formula conforming to Formula II above in which $R_1$, $R'_1$, $R''_1$ are radicals of the type defined in connection with the R substituents of Formula I, and the other R substituents are hydrogen atoms. Compounds having thisp referred formula in which $R_1$, $R'_1$ and $R''_1$ are lower alkyl groups are presently considered optimum for use in accordance with this invention, primarily because of their relatively low cost and ease of manufacture.

While the compounds of Formula II generally provide improved antistatic properties in polymeric materials, certain of the other classes of caged boron-nitrogen compounds described herein, such as those represented by Formulas III through VI, may produce equivalent or superior results with particular polymeric materials.

Specific caged boron-nitrogen compounds which can be effectively used in polymeric materials in accordance with this invention, and which impart improved antistatic properties to such polymeric materials include:

2,8,9-trioxa-5-aza-1-boratricyclo[3.3.3.0]undecane
2,10,11-trioxa-6-aza-1-boratricyclo[4.4.4.0]tetradecane
12-methyl-2,10,11-trioxa-6-aza-1-boratricyclo[4.4.3.0] tridecane
8,11-dimethyl-2,9,10-trioxa-6-aza-1-boratricyclo[4.3.3.0] dodecane
3-methyl-2,8,9-trioxa-5-aza-1-boratricyclo[3.3.3.0] undecane
3,7-dimethyl-2,8,9-trioxa-5-aza-1-boratricyclo[3.3.3.0] undecane
3,7,10-trimethyl-2,8,9-trioxa-5-aza-1-boratricyclo[3.3.3.0] undecane
3,7-dimethyl-10-ethyl-2,8,9-trioxa-5-aza-1-borotricyclo [3.3.3.0]undecane
3-methyl-7,10-diethyl-2,8,9-trioxa-5-aza-1-borotricyclo [3.3.3.0]undecane
3,7-dimethyl-11-ethyl-2,8,9-trioxa-5-aza-1-boratricyclo [3.3.3.0]undecane
4,4,7,10-tetramethyl-2,8,9-trioxa-5-aza-1-boratricyclo- [3.3.3.0]undecane
3,7-dihydroxymethyl-2,8,9-trioxa-5-aza-1-boratricyclo- [3.3.3.0]undecane
3-methyl-7,10-diphenyl-2,8,9-trioxa-5-aza-1-boratricyclo- [3.3.3.0]undecane
3,7-dimethyl-10-phenyl-2,8,9-trioxa-5-aza-1-boratricyclo- [3.3.3.0]undecane
11,14-dimethyl-2,12,13-trioxa-9-aza-1-boratetracyclo- [7.3.3.0.0³,⁸]pentadeca-3,5,7-triene
3-hydroxymethyl-7,10-dimethyl-2,8,9-trioxa-5-aza-1- boratricyclo[3.3.3.0]undecane
3,7-dihydroxymethyl-10-methyl-2,8,9-trioxa-5-aza-1- boratricyclo[3.3.3.0]undecane
3-hydroxymethyl-2,8,9-trioxa-5-aza-1-boratricyclo- [3.3.3.0]undecane stearate

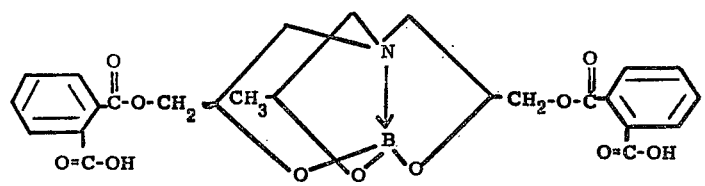

or

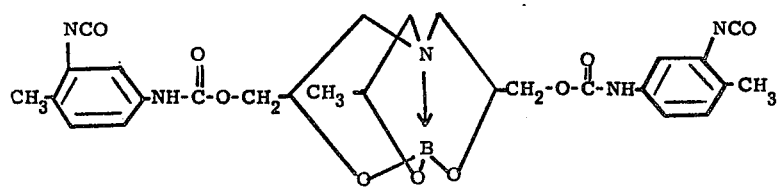

3,7-diphenoxymethyl-10-methyl-2,8,9-trioxa-5-aza-1-boratricyclo[3.3.3.0]undecane
3-aminomethyl-7,10-dimethyl-2,8,9-trioxa-5-aza-1-boratricyclo[3.3.3.0]undecane
3,7,10-trihydroxymethyl-2,8,9-trioxa-5-aza-1-boratricyclo-[3.3.3.0]undecane
3,7,10-triethyl-2,8,9-trioxa-5-aza-1-boratricyclo[3.3.3.0]undecane
3-hydroxymethyl-7,10-dimethyl-2,8,9-trioxa-5-aza-1-boratricyclo[3.3.3.0]undecane acetate
3-hydroxymethyl-7,10-dimethyl-2,8,9-trioxa-5-aza-1-boratricyclo[3.3.3.0]undecane palmitate
3-hydroxymethyl-7,10-dimethyl-2,8,9-trioxa-5-aza-1-boratricyclo[3.3.3.0]undecane stearate or boric acid derivatives such as tributyl borate. These reactions can be illustrated by the following equations:

Preparation of amines

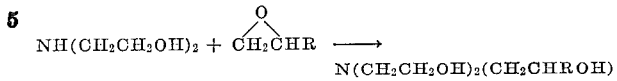

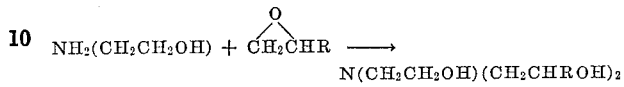

PREPARATION OF CAGED BORON-NITROGEN CONTAINING COMPOUNDS

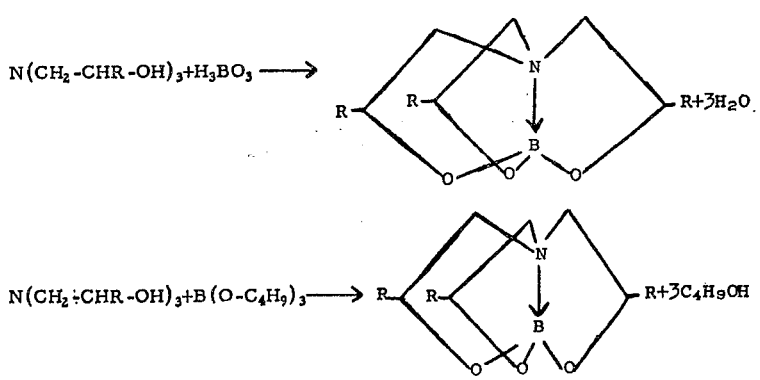

3-hydroxymethyl-7,10-dimethyl-2,8,9-trioxa-5-aza-1-boratricyclo[3.3.3.0]undecane oleate
3-hydroxymethyl-7,10-dimethyl-2,8,9-trioxa-5-aza-1-boratricyclo[3.3.3.0]undecane pelargonate and compounds having the following formulas:

The reaction of the amine with boric acid or tributyl borate is generally carried out under vacuum conditions during the last stages of the reaction to insure that the reaction is driven to completion. The reaction is carried out at an initial temperature of about 120–140° C. which

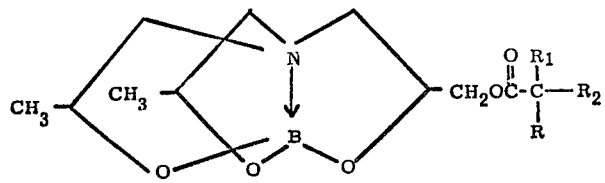

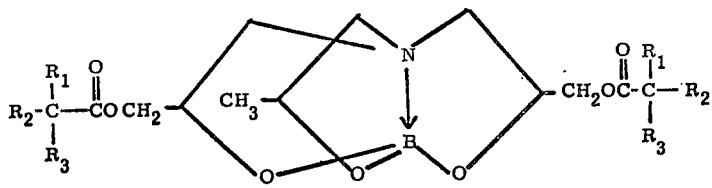

[wherein $R_1$, $R_2$, and $R_3$ are lower alkyl groups and have a total of about 7 to 9 carbon atoms]

is gradually elevated to about 150–200° C. Water (when a boric acid reactant is used) or butyl alcohol (when a

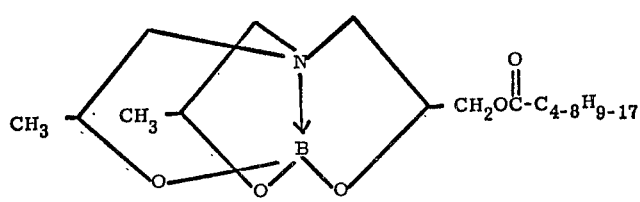

The caged antistatic agents of this invention can be prepared by reacting ammonia or an appropriate alkanolamine with an epoxy compound, and then reacting the product of that reaction with boric acid, boric anhydride tributyl borate reactant is used) are removed as by-products of the reaction.

A detailed description of the use of this method in the preparation of certain of the antistatic agents of this invention is given in our copending application Ser. No. 707,809, filed Feb. 23, 1968.

The caged boron-nitrogen containing compounds used in this invention may exist as mixtures of various isomers. For example, 3,7,10-trimethyl-2,8,9-trioxa-5-aza-1-boratricyclo[3.3.3.0]undecane is a mixture of four (4) isomers differing in the configuration in which the methyl groups are substituted on the 3, 7, and 10 carbon atoms.

Various of the antistatic agents of this invention can exist as mixtures of caged compounds having different ring sizes, but all of which have the same chemical formula, i.e., the same atom content. For example, it has been found that 3,7,10-trihydroxymethyl-2,8,9-trioxa-5-aza-1-boratricyclo[3.3.3.0]undecane is, in fact, a mixture of isomers differing in ring structure, with about 80% or more containing at least one six-membered ring. Thus, the compound so designated is most likely a mixture of the following most likely isomers:

The caged boron-nitrogen compounds of this invention can also be applied to textile fibers or fabrics by spraying, dipping, brushing, or any other conventional method. Generally the antistatic agents are applied to the textile materials in dilute aqueous solutions and thus can be applied by a conventional kiss roll on a winding machine.

When the polymeric materials are treated with aqueous solutions of the antistatic materials described herein, the antistat selected is preferably one having a high degree of hydrolytic stability. The caged boron-nitrogen compounds used in this invention have varying hydrolytic stabilities; however, it has been found that generally those compounds containing at least one six (6) membered ring show the best hydrolytic stability properties, as is more fully shown in the following examples.

Aqueous solutions of the antistatic agents of this invention suitable for treatment of textile materials can be prepared by dissolving selected compounds of this in-

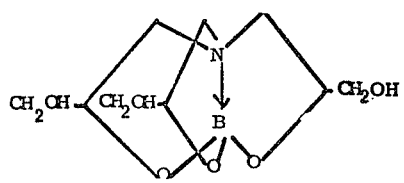

3,7,10-trihydroxymethyl-2,8,9-trioxa-5-aza-1-boratricyclo [3.3.3.0] undecane

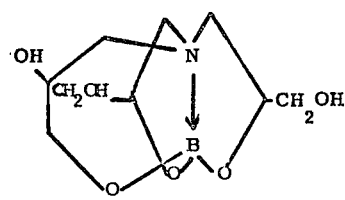

4-hydroxy-8,11-dihydroxymethyl-2,9,10-trioxa-6-aza-1-boratricyclo [4.3.3.0] dodecane

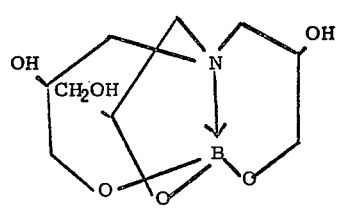

4,8-dihydroxy-12-hydroxymethyl-2,10,11-trioxa-6-aza-1-boratricyclo [4.4.3.0] tridecane

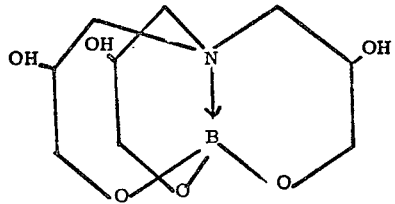

4,8,13-trihydroxy-2,10,11-trioxa-6-aza-1-boratricyclo [4.4.4.0] tetradecane

In addition to imparting improved antistatic properties to polymeric materials, treatment of polymeric materials with the caged boron-nitrogen containing compounds described herein also has been found to improve the flame resistance properties of the polymeric materials.

The caged boron-nitrogen containing compounds of the invention can be used to treat natural and synthetic polymeric textile materials in the form of fibers, yarns, filaments, rovings, slivers, tops or the like. They can also be used in the treatment of polymeric materials in the form of sheets, films, or shaped articles. The textile or other polymeric materials which can be advantageously treated with these antistatic agents include natural fibers such as wool, cotton, silk and the like, and synthetic fibers such as polyvinyl chloride, polyvinyl acetate, polyethylene, polypropylene, polyethylene terephthalate, copolymers of vinyl chloride and vinyl acetate, polyesters, polyamides, and polyacrylates.

The caged boron-nitrogen compounds used in this invention can be applied to or incorporated in the synthetic polymeric material using conventional methods. For example, in preparing sheet materials, films, or shaped articles from polyvinyl chloride, the caged boron-nitrogen compounds are generally added just prior to milling of the polymeric materials. The antistatic agents are generally blended with polyethylene and polypropylene resins in a mechanical blender such as a Waring Blendor before the resin mixture is fused under pressure at elevated temperatures.

vention in water at room temperature with vigorous stirring. The concentration of the antistatic agents in such aqueous treatment baths can vary widely, and concentrations as low as about 0.05% by weight and as high as about 6% by weight can be satisfactorily used. Concentrations of about 0.1 to 2.0% by weight are generally preferred. Any of the foregoing concentrations will be suitable to provide from about 0.0025 to 0.30% of solids pickup based on the weight of the dry textile material being treated.

When the antistatic agents of this invention are to be incorporated in resinous sheets, films, or shaped articles, they will generally be included in such articles in amounts of about 0.05 to about 10% by weight, and preferably in amounts of about 1 to 4% by weight.

While the additives of this invention have been particularly described as caged boron-nitrogen compounds, in some instances caged aluminum-nitrogen compounds can also be used in accordance with the invention and in substitution for the caged boron-nitrogen compounds. Exemplary of such aluminum-nitrogen compounds is 3,7,10-trimethyl-2,8,9-trioxa-5-aza-1-aluminatricyclo[3.3.3.0] undecane.

To illustrate the invention more specifically, reference is now made to the following examples. These examples are merely illustrative and are not to be understood as limiting the scope and underlying principles of the invention in any way. The parts and percentages referred to herein are by weight based upon the weight of the resin.

The following tests are used to show the antistatic properties of various polymeric materials in both sheet and fiber form after they are treated with the caged boron-nitrogen compounds of this invention. The antistatic testing is carried out in two ways—by the Ash Test and by a static electricity test carried out using a Rothschild Static Tester.

In the Ash Test, 20 mil sheets of polyvinyl chloride film compositions containing various amounts of the caged boron-nitrogen containing antistatic agents of this invention are grounded, together with a wool cloth, on a cold water pipe. The wool cloth is then rubbed over the sample sheet for 20 back-and-forth cycles using moderate hand pressure. The resulting polyvinyl chloride sheet is placed over a 12 cm. watch glass partially filled with cigarette ashes, and the amount of ash picked up by the vinyl sheet is compared to a control sheet in which no antistat material is used. Thus the terms "heavy," "moderate," "slight" and "very slight" are comparisons with a control that was rated as heavy. The tests vary with relative humidity, tending to show more ash accumulation on dry days. The results of these tests, which show the relative effectiveness of various of the caged boron-nitrogen antistatic agents tested, are reported in Table I.

In the use of the Rothschild Static Tester, 20 mil polyvinyl chloride sheets containing various of the caged boron-nitrogen compounds of this invention are cut into dumbbells and these dumbbells are aged for at least 24 hours at a relative humidity of 35% at 72° F. The dumbbells are then placed between the electrodes of the Tester and a 100-volt charge is applied across the dumbbells. The time required for the sample to dissipate one-half of the charge is recorded to show the effectiveness of the various antistatic agents tested. If half the charge is not dissipated in fifteen minutes the result is expressed as the percent of charge remaining after 15 minutes. The results of these tests are also shown in Table I.

EXAMPLES 1–58

The polyvinyl chloride films tested in these examples each contained dioctyl phthalate in amounts sufficient to make the aggregate amount of dioctyl phthalate and caged boron-nitrogen compound present in each sample 50% by weight of the polyvinyl chloride. Each sample also contained 1% by weight of a composition sold under the trademark Ferro 903 which is an aromatic phosphite chelator dissolved in a high boiling inert/solvent, containing 3.50% by weight phosphorus, and 2% by weight of a barium/cadmium coconate or laurate stabilizer, sold under the trademark "Ferro 1820." Other conventional polyvinyl chloride stabilizer systems could be substituted for the Ferro 903 and Ferro 1820 stabilizers, and various other conventional plasticizers for polyvinyl chloride can be substituted for dioctyl phthalate.

The sheets are prepared by milling the polyvinyl chloride, dioctyl phthalate, stabilizers, and caged compound on a two-roll mill maintained at 325° F. The mix is hand worked for five minutes after a continuous film is formed and 20 mil sheets are then pressed at 345° F. from 25 g. of milled sheet. The pressing cycle used is 500 platen p.s.i. for 2 minutes, and 1500 p.s.i. for four minutes, followed by cooling and removal of the pressed sheet.

The borate ester additives substituted for the caged boron-nitrogen compounds of this invention in Examples 52–58 have similar hydrolytic stabilities as most caged compounds, but do not have the caged structure. The results achieved using these borate esters are uniformly unsatisfactory, indicating that the improvement achieved by this invention is attributable to the caged boron-nitrogen structure of the additives used herein and not to borate esters per se.

TABLE I

| Ex. No. | Antistatic agent | Amount, percent by weight of polymer | Ash test, amount of ash | Rothschild test, ½ life of charge, min. |
|---|---|---|---|---|
| 1 | 2,8,9-trioxa-5-aza-1-boratricyclo [3.3.3.0] undecane | 3 | None | 3.9; 1.7; 7.2; >15. |
| 2 | 3,7,10-trimethyl-2,8,9-trioxa-5-aza-1-boratricyclo[3.3.3.0]undecane | 1 | Heavy | 10.9; 11.2; 10.8. |
| 3 | do | 1 | Slight | 8.3; 9.9; 5.4. |
| 4 | do | 2 | do | 3.7; 4.1; 3.5. |
| 5 | do | 3 | Very slight | 1.9; 1.7; 2.1. |
| 6 | do | 3 | Moderate | 3.0; 3.3; 2.4; 2.6. |
| 7 | do | 5 | None | 1.6; 1.6; 1.6. |
| 8 | do | 10 | do | 1.8; 1.7; 1.9; 2.0. |
| 9 | 3,7-dimethyl-10-ethyl-2,8,9-trioxa-5-aza-1-boratricyclo[3.3.3.0]undecane | 1 | Moderate | 4.9; 4.8; 5.5. |
| 10 | do | 2 | Slight | 3.2; 3.4; 2.8. |
| 11 | do | 3 | Heavy | 8.1; 8.6; 5.6. |
| 12 | do | 3 | Very slight | 2.7; 2.7; 3.0; 2.3. |
| 13 | do | 5 | None | 1.2; 1.0; 1.2. |
| 14 | do | 10 | do | 0.6; 0.4; 0.8; 0.9. |
| 15 | do | 3 | do | 0.9; 0.7; 1.1; 1.0. |
| 16 | do | 10 | do | |
| 17 | 3-methyl-7,10-diethyl-2,8,9-trioxa-5-aza-1-boratricyclo[3.3.3.0]undecane | 3 | Moderate | 3.1; 3.6; 3.7; 2.9. |
| 18 | do | 10 | Slight | 3.8; 3.7; 4.3; 4.7. |
| 19 | 3,7-dimethyl-10-phenyl-2,8,9-trioxa-5-aza-1-boratricyclo[3.3.3.0]undecane | 10 | None | 5.7; 6.2; 6.3; 5.3. |
| 20 | 3-methyl-7,10-diphenyl-2,8,9-trioxa-5-aza-1-boratricyclo[3.3.3.0]undecane | 10 | do | >15; >15; >15; >15. |
| 21 | 11,14-dimethyl-2,12,13-trioxa-9-aza-1-boratetracyclo[7.3.3.0.0³,⁸]pentadeca-3,5,7-triene. | 10 | Moderate | 13.5. |
| 22 | 3-hydroxymethyl-7,10-dimethyl-2,8,9-trioxa-5-aza-1-boratricyclo[3.3.3.0] undecane stearate. | 10 | | 3.4; 2.6; 4.0. |
| 23 | 3-hydroxymethyl-7,10-dimethyl-2,8,9-trioxa-5-aza-1-boratricyclo[3.3.3.0] undecane oleate. | 10 | | 2.6; 2.0; 2.7. |
| 24 | 3-hydroxymethyl-7,10-dimethyl-2,8,9-trioxa-5-aza-1-boratricyclo[3.3.3.0] undecane versatate.[1] | 1 | Moderate | 0.4; 0.4; 1.5. |
| 25 | do | 3 | Heavy | 1.9; 1.1; >15. |
| 26 | do | 5 | do | 12.0; 8.9; 13.5. |
| 27 | do | 10 | None | 4.3; 4.3; 4.1; 4.9; 5.2. |
| 28 | 3,7-dihydroxymethyl-10-methyl-2,8,9-trioxa-5-aza-1-boratricyclo[3.3.3.0] undecane. | 3 | Moderate | >15; 8.4; >15; >15. |
| 29 | 3,7-diphenoxymethyl-10-methyl-2,8,9-trioxa-5-aza-1-boratricyclo[3.3.3.0] undecane. | 10 | do | >15; >15 10.8 |
| 30 | 3,7-dihydroxymethyl-10-methyl-2,8,9-trioxa-5-aza-1-boratricyclo[3.3.3.0] undecane diversatate.[1] | 10 | None | >15; 14.1; >15; 13.4; >15. |
| 31 | 4,4,7,10-tetramethyl-2,8,9-trioxa-5-aza-1-boratricyclo[3.3.3.0]undecane | 3 | do | 2.7; 2.0; 2.9; 3.0. |
| 32 | do | 10 | do | 2.1; 2.6; 1.8; 2.0. |
| 33 | 8,11-dimethyl-2,9,10-trioxa-6-aza-1-boratricyclo[4.3.3.0]dodecane | 3 | Moderate | 2.7; 2.6; 3.0; 3.1. |
| 34 | 12-methyl-2,10,11-trioxa-6-aza-1-boratricyclo[4.4.3.0]tridecane | 3 | Heavy | 2.7; 0.4; 1.2; 10.5. |
| 35 | 2,10,11-trioxa-6-aza-1-boratricyclo[4.4.4.0]tetradecane | 3 | Moderate | >15; >15; >15; >15. |
| 36 | 3-methyl-2,8,9-trioxa-5-aza-1-boratricyclo [3.3.3.0]undecane | 3 | None | 11.1; 12.6; 6.3; >15. |
| 37 | 3,7-dimethyl-2,8,9-trioxa-5-aza-1-boratricyclo[3.3.3.0]undecane | 3 | Moderate | 7.7; 1.7; 6.8; 11.4. |
| 38 | 3-hydroxymethyl-7,10-dimethyl-2,8,9-trioxa-5-aza-1-boratricyclo[3.3.3.0] undecane E-1210 ate.[2] | 3 | Slight | 6.5; 5.9; 5.7; 7.3. |
| 39 | do | 10 | None | 1.5; 1.5; 0.9; 1.0. |
| 40 | 3,7,10-trihydroxymethyl-2,8,9-trioxa-5-aza-1-boratricyclo [3.3.3.0] undecane | 3 | Heavy | 12.5; >15; >15; 6.2. |

See footnotes at end of table.

TABLE I—Continued

| Ex. No. | Antistatic agent | Amount, percent by weight of polymer | Ash test, amount of ash | Rothschild test, ½ life of charge, min. |
|---|---|---|---|---|
| 41 | 3,7-dimethyl-10-dodecyl-2,8,9-trioxa-5-aza-1-boratricyclo [3.3.3.0] undecane | 3 | Moderate | 13.5. |
| 42 | 3-allyloxymethyl-7, 10-dimethyl-2, 8, 9-trioxa-5-aza-1-boratricyclo [3. 3. 3. 0] undecane. | 3 | Slight | 2.6. |
| 43 | 3-vinyl-7,10-dimethyl-2, 8, 9-trioxa-5-aza-1-boratricyclo [3.3.3.0] undecane | 3 | Slight-moderate | 3.4. |
| 44 | 3-hydroxymethyl-2, 8, 9-trioxa-5-aza-1-boratricyclo [3.3.3.0] undecane stearate | 3 | None | 0.8. |
| 45 | 11,14-dimethyl-2,12,13-trioxa-9-aza-1-boratetracyclo [7.3.3.0³,⁸]pentadecane | 3 | Slight-moderate | 2.4. |
| 46 | 3,7-dimethyl-10-hexadecyl-2, 8, 9-trioxa-5-aza-1-boratricyclo [3. 3. 3. 0] undecane | 3 | Moderate | 5.0. |
| 47 | 2,9,10-trioxa-6-aza-1-boratricyclo [4.3.3.0] dodecane | 3 | Slight | 4.4. |
| 48 | 8,11-dihydroxymethyl-2,9,10-trioxa-6-aza-1-boratricyclo [4. 3. 3. 0] dodecane | 3 | Heavy | 10.9 |
| 49 | 3-phenoxymethyl-7,10-dimethyl-2,8,9-trioxa-5-aza-1-boratricyclo [3.3.3.0]undecane; | 10 | do | 0.7; >15; >15; >15. |
| 50 | None | | Moderate | 12.9; 5.8, 7.0; >15. |
| 51 | do | | Heavy | >15; 15.3; 15.2; 2.6. |
| 52 | tri-2-cyclohexyl-cyclohexanyl borate | 5 | do | 7.1; 5.4; 8.9. |
| 53 | do | 10 | do | >15; >15; >15. |
| 54 | 2,4-dimethyl-3-pentanyl borate | 5 | do | 8.9; 7.9; >15. |
| 55 | do | 10 | do | >15; >15; 14.4. |
| 56 | 2,6-dimethyl-4-heptanyl borate | 5 | do | 8.5; 6.7; 13.8. |
| 57 | do | 10 | do | 14.5; 5.2; 14.6. |
| 58 | tri-Orthomethylphenylborate | 5 | do | >15; >15; >15. |

[1] Versatic acid is a mixture of neoacids having the formula $HO-\overset{O}{\overset{\|}{C}}-\overset{R^1}{\underset{R^3}{\overset{|}{C}}}-R_2$ where $R_1$, $R_2$, $R_3$ are alkyl groups containing 7 to 9 carbon atoms.

[2] E-1210 acids are a commercial mixture of straight chain aliphatic carboxylic acids containing 4 to 9 carbon atoms.

EXAMPLE 59–66

The effect of the caged boron-nitrogen compounds of this invention on the flammability of plasticized polymer sheets impregnated with the boron-nitrogen compounds of this invention is tested in these examples. In making these flammability tests, 20 mil polyvinyl chloride sheets containing the caged nitrogen-boron compounds are cut into 2″ x 8″ samples and each sample is placed on a ¼″ steel mesh screen and positioned 1½″ above a wing-topped ⅜″ bore Bunsen burner. The flame is adjusted to about 5″ above the top of the burner and a diameter of 1½″, and placed perpendicular to the longitudinal axis of each sample sheet at the center of the sample.

The flame is retained under the sample for thirty (30) seconds and the time required for the flame to go out is then recorded. The results of these flammability tests, which are shown in Table II below, indicate that certain of the caged boron-nitrogen derivatives of this invention exhibit the characteristics of nonflammable plastic additives.

TABLE II.—FLAMMABILITY TESTS

| | Example No. | | | | | | | |
|---|---|---|---|---|---|---|---|---|
| | 59 | 60 | 61 | 62 | 63 | 64 | 65 | 66 |
| Additive | (1) | (2) | (3) | (4) | (5) | (6) | (7) | (8) |
| Film composition: | | | | | | | | |
| Polyvinyl chloride (Geon 101) | 100 | 100 | 100 | 100 | 100 | 100 | 100 | 100 |
| Dioctyl phthalate | 40 | 50 | 40 | 40 | 40 | 40 | 40 | 40 |
| Ba/Cd laurate stabilizer | 2 | 2 | 2 | 2 | 2 | 2 | 2 | 2 |
| Ferro 903 stabilizer | 1 | 1 | 1 | 1 | 1 | 1 | 1 | 1 |
| Nonflammable additive | | | 10 | 10 | 10 | 10 | 10 | 10 |
| Time to flame out: | | | | | | | | |
| Number 1, sec | 27 | (9) | 20 | (9) | 16 | 7 | (9) | (9) |
| Number 2, sec | 45 | (9) | 21 | 29 | 16 | 8 | 36 | (9) |
| Number 3, sec | (9) | (9) | (9) | 31 | 26 | 8 | (9) | 38 |

[1] Blank 1.
[2] Blank 2.
[3] Tricresyl phosphate.
[4] 3,7,10-trimethyl-2,8,9-trioxa-5-aza-1-boratricyclo [3.3.3.0] undecane.
[5] 3,7,-dimethyl-10-phenyl-2,8,9-trioxa-5-aza-1-boratricyclo [3.3.3.0] undecane.
[6] 3-methyl-7,10-diphenyl-2,8,9-trioxa-5-aza-1-boratricyclo [3.3.3.0] undecane.
[7] 11,14-dimethyl-2,12,13-trioxa-9-aza-1-bora tetracyclo [7.3.3.0 ³,⁸] pentadeca-3,5,7-triene.
[8] 3-hydroxymethyl-7,10-dimethyl-2,8,9-trioxa-5-aza-1-boratricyclo [3.3.3.0] undecane palmitate.
[9] Sample completely consumed by flames.

EXAMPLES 67–76

In these examples, the caged boron-nitrogen compounds used in this invention are incorporated in polyethylene and polypropylene resins and the resulting resins are tested for their antistatic properties. The test samples are prepared by blending the polymer with the caged compound in a Waring Blendor for one to two minutes, fusing the blended resin mixture in a Brabender Plasticorder at 200° C., and then pressing at 350° F. for two minutes under a pressure of 2000 p.s.i. About 3% (by weight of the polymer) of the caged compound is incorporated in each of the polymers tested.

The antistatic properties of the resulting resin films are measured by the Ash Test and with the Rothschild Static Tester. The results are shown in Table III.

TABLE III

| Ex. No. | Resin | Antistatic agent | Amount of antistatic agent, wt. percent | Ash pickup | Rothschild tester, percent of charge remaining after 15 mins. |
|---|---|---|---|---|---|
| 67 | Polyethylene | None | | Heavy | 98 |
| 68 | do | 3,7,10-trimethyl-2,8,9-trioxa-5-aza-1-boratricyclo[3.3.3.0] undecane | 3 | None | 87.5 |
| 69 | do | 3,7-diphenoxymethyl-10-methyl-2,8,9-trioxa-5-aza-1-boratricyclo[3.3.3.0] undecane. | 3 | Heavy | 93 |
| 70 | do | 3-phenyl-7,10-dimethyl-2,8,9-trioxa-5-aza-1-boratricyclo[3.3.3.0] undecane | 3 | do | 91 |
| 71 | do | 3-hydroxymethyl-7,10-dimethyl-2,8,9-trioxa-5-aza-1-boratricyclo[3.3.3.0] undecane stearate | 3 | None | 60 |
| 72 | Polypropylene | None | | Heavy | 94 |
| 73 | do | 3,7,10-trimethyl-2,8,9-trioxa-5-aza-1-boratricyclo[3.3.3.0] undecane | 3 | Slight | 94.5 |
| 74 | do | 3,7-diphenoxymethyl-10-methyl-2,8,9-trioxa-5-aza-1-boratricyclo[3.3.3.0] undecane. | 3 | Slight-moderate | 97.5 |
| 75 | do | 3-phenyl-7,10-dimethyl-2,8,9-trioxa-5-aza-1-boratricyclo[3.3.3.0]undecane | 3 | Moderate | 95.5 |
| 76 | do | 3-hydroxymethyl-7,10-dimethyl-2,8,9-trioxa-5-aza-1-boratricyclo[3.3.3.0] undecane stearate | 3 | Very slight | 78 |

EXAMPLES 77–86

In these examples, vinyl chloride copolymer (VYHH) resins containing about 87% by weight of vinyl chloride and 13% by weight of vinyl acetate, a typical phonographic record formulation, are tested for their antistatic characteristics after the addition of one of the caged boron-nitrogen compounds of this invention. The vinyl chloride-vinyl acetate copolymer films are milled in the same manner as the polyvinyl chloride films of Examples 1–58 except that the millng is carried out at a temperature of 266° F. rather than the 325° F. temperature used with poly-vinyl chloride in those examples. The films are pressed at 500 p.s.i. for two minutes, 1500 p.s.i. for two minutes, and 2000 p.s.i. for two minutes at 270° F., and are then cooled and removed from the press.

The polymer mixtures of Examples 77, 78, 79, and 84 each contain 100 parts of the copolymer, 5 parts of a carbon black pigment sold under the trademark Carbolac-2; and 1.5 parts of lead stearate sold under the trademark DS-207. The samples of Examples 80–83 and 85 each contain 100 parts of the copolymer and 1.5 parts of a lead stearate stabilizer sold under the trademark Ferro 13V57. The amount of caged compound present in each example is indicated in Table IV. The particular antistatic agent used in each of these examples is 3,7,10-trimethyl - 2,8,9 - trioxa-5-aza-1-boratricyclo[3.3.3.0]undecane.

The resulting films were tested by the Ash Test and with the Rothschild Static Tester and the results of these tests are shown in Table IV. These results indicate that the inclusion in the polymer of at least about 2% (by weight of the polymer) of the caged boron-nitrogen compound is advantageous.

TABLE IV

| Ex. No. | Amount of antistatic agent, percent by wt. of polymer | Ash test | Rothschild static tester, minimum result of 4 tests |
|---|---|---|---|
| 77 | 1 | | 6 min. 55 sec. |
| 78 | 2 | | 52%. |
| 79 | 3 | Moderate | 8 min. 17 sec. |
| 80 | 0.5 | Heavy | 62%. |
| 81 | 1.0 | do | 8 min. 43 sec. |
| 82 | 1.5 | Moderate | 87%. |
| 83 | 3.0 | Heavy | 3 min. 42 sec. |
| 84 | None | | 65%. |
| 85 | do | Moderate | 91%. |
| 86 | Commercial phonograph record | Heavy | 83%. |

EXAMPLES 87–93

In these examples, one of the antistatic agents of the present invention, 3,7,10-trimethyl-2,8,9-trioxa-5-aza-1-boratricyclo[3.3.3.0]undecane, is applied to polyester fiber and the resulting fiber is tested to determine its antistatic properties. The antistatic agent is applied from a 0.5% aqueous solution by a kiss roll application technique to polyethylene terephthalate which has been previously extracted with 1,1,1-trichloroethane to remove the producer finish.

The antistatic testing is carried out by pulling the treated fiber at a constant speed of 300 ft./min. over the roller electrodes of a Rothschild Static Volt Meter. The charge build-up per six-second time interval is recorded. The results of these tests and identical runs made with commercially available antistatic agents are shown in Table V. The caged boron-nitrogen compound is found to perform well in this testing, achieving significantly better results than a number of the commercial antistatic agents.

TABLE V

| Ex. No. | Antistatic agent | Voltage build-up of six (6) second period |
|---|---|---|
| 87 | None | 150–250 |
| 88 | Dimethylaminopropylamine $C_6$–$C_9$ mixed aliphatic monocarboxylic acid amide-diethyl sulfate quaternary salt. | 0–100 |
| 89 | Diethylsulfate quaternary salt of the oleyl amide of N-aminopropyl morpholine. | 150–200 |
| 90 | Oleyl imidazoline diethyl sulfate quaternary salt (Atlas 3634). | 185–215 |
| 91 | Diethanolaminepelargonate (Emery 3015) | 140–160 |
| 92 | Diethylaminoethyloleylamine hydrochloride | 0–50 |
| 93 | 3,7,10-trimethyl-2,8,9-trioxa-5-aza-1-boratricyclo [3.3.3.0] undecane. | 50–100 |

EXAMPLES 94–105

These examples are carried out to determine the hydrolytic stability of the caged boron-nitrogen compounds of this invention.

In each example, 1–2 g. of an accurately weighed sample of the water-soluble, caged, boron-nitrogen derivative is weighed into a 100 ml. volumetric flask. The derivative is dissolved in distilled water at room temperature and the solution is allowed to stand at room temperature for the duration of the test. Ten ml. samples are taken periodically over a 2,000 hour period and titrated with 0.02–0.03 N hydrochloric acid to a bromphenolblue endpoint. This titration determines the amount of free amine and is equivalent to the amount of non-caged nitrogen present, and in turn indicates the hydrolytic stability of the compounds.

The results of these tests are shown in Table VI. It is noted that slight changes in compound structure have a drastic effect on hydrolytic stability. The use of hydrolitically stable additives is particularly advantageous in textile applications where the additives are normally applied from aqueous solution.

TABLE VI.—HYDROLYTIC STABILITIES

| Ex. No. | Compound | Substitution or ring expansion | Halflife |
|---|---|---|---|
| 94 | 3-methyl-2,8,9-trioxa-5-aza-1-boratricyclo[3.3.3.0]undecane | 3-$CH_3$ | 1 hour. |
| 95 | 3,7-dimethyl-2,8,9-trioxa-5-aza-1-boratricyclo[3.3.3.0]undecane | 3-$CH_3$, 7-$CH_3$ | Isomer A—30%—12 hours, Isomer B—70%—53 days. |
| 96 | 3,7,10-trimethyl-2,8,9-trioxa-5-aza-1-boratricyclo[3.3.3.0]undecane | 3-$CH_3$, 7-$CH_3$, 10-$CH_3$ | 89%—301 days. |
| 97 | 3,7-dimethyl-10-ethyl-2,8,9-trioxa-5-aza-1-boratricyclo[3.3.3.0]undecane | 3-$CH_3$, 7-$CH_3$, 10-$CH_2CH_3$ | 484 days. |
| 98 | 3,7-dimethyl-11-ethyl-2,8,9-trioxa-5-aza-1-boratricyclo[3.3.3.0]undecane | 3-$CH_3$, 7-$CH_3$, 11-$CH_2CH_3$ | 878 days. |
| 99 | 4,4,7,10-tetramethyl-2,8,9-trioxa-5-aza-1-boratricyclo[3.3.3.0]undecane | 4-$CH_3$, 4-$CH_3$, 7-$CH_3$, 10-$CH_3$ | 1023 days. |
| 100 | 3-methyl-7,10-diethyl-2,8,9-trioxa-5-aza-1-boratricyclo[3.3.3.0]undecane | 3-$CH_3$, 7-$CH_2CH_3$, 10-$CH_2CH_3$ | 1023 days. |
| 101 | 3,7-dihydroxymethyl-10-methyl-2,8,9-trioxa-5-aza-1-boratricyclo[3.3.3.0]undecane | 3-$CH_2OH$, 7-$CH_2OH$, 10-$CH_3$ | Isomer A—7.36%—199 days, Isomer B[1]—80.08%—9200 days. |
| 102 | 3,7,10-trihydroxymethly-2,8,9-trioxa-5-aza-1-boratricyclo[3.3.3.0]undecane | 3-$CH_2OH$, 7-$CH_2OH$, 10-$CH_2OH$ | Isomer A—5.98%—88 days, Isomer B[1]—83.66%—∞. |
| 103 | 8,11-dimethyl-2,9,10-trioxa-6-aza-1-boratricyclo[4.3.3.0]dodecane | 8-$CH_3$, 11-$CH_3$, one six-membered ring. | ∞ |
| 104 | 12-methyl-2,10,11-trioxa-6-aza-1-boratricyclo[4.4.3.0]tridecane | 12-$CH_3$, 2 six-membered rings | ∞ |
| 105 | 2,10,11,trioxa-6-aza-1-boratricyclo[4.4.4.0]tetradecane | 3 six-membered rings | ∞ |

[1] A mixture of ringed isomers containing at least one six-membered ring.

Caged boron-nitrogen-containing compounds described herein are also useful as plastic film anti-fogging agents and as color improving agents for fatty acid distillations. These compounds can be added in amounts of about 0.05% to 1% of the acid to such fatty acids as cottonseed oil fatty acids prior to or during their distillation to produce an acid distillate having improved color. Preferred compounds for anti-fogging purposes are 3 - hydroxymethyl - 2,8,9 - trioxa - 5 - aza - 1 - boratricylo [3.3.3.0] undecane stearate and 3,7,10 - trimethyl - 2,8,9-trioxa-5 - aza - 1 - boratricyclo [3.3.3.0] undecane. The latter compound is also preferred for use in improving the color of fatty acids.

For anti-fogging purposes amounts of about 1 to 5% by weight based on the weight of the pastic resin, e.g. polyvinyl chloride may be used. Preferably 1 to 3% by weight is used.

The invention in its broader aspects is not limited to the specific details shown and described, and departures may be made from such details within the spirit and scope of the accompanying claims without departing from the principles of the invention and without sacrificing its chief advantages.

What is claimed is:
1. A polymeric material comprising a polymer selected from the group consisting of polyvinyl chloride, polyethylene, polypropylene, vinyl chloride-vinyl acetate copolymers, and polyesters, and a caged boron-nitrogen compound having the formula:

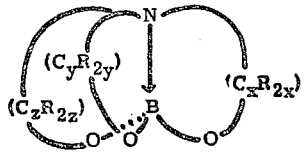

wherein $x$, $y$ and $z$ are the same or different integers from 2 through 4, and each R substituent on each ring of said caged boron-nitrogen compound is selected from the group consisting of:
  (a) hydrogen,
  (b) lower alkyl radicals containing from 1 to 16 carbon atoms,
  (c) cycloalkyl radicals containing from 3 to 7 carbon atoms,
  (d) alkenyl and cycloalkenyl radicals containing from 2 to 7 carbon atoms,
  (e) aryl radicals,
  (f) hydroxy-substituted $C_1$ to $C_6$ lower alkyl radicals,
  (g) amino-substituted $C_1$ to $C_6$ lower alkyl radicals,
  (h) aryl-substituted lower alkyl radicals,
  (i) radicals of the formula

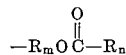

where $R_m$ is a lower alkylene radical containing 1 to 6 carbon atoms and $R_n$ is selected from the group consisting of $C_1$ to $C_{18}$ alkyl radicals, $C_1$ to $C_{18}$ alkenyl radicals, and aryl radicals,
  (j) $R_nOR_p$ where $R_n$ is as defined above and $R_p$ is selected from the group consisting of $C_1$ to $C_6$ lower aliphatic radicals, aryl radicals, and $C_1$ to $C_6$ alkenyl radicals, and,
  (k) alkylnitriles.

2. The composition of claim 1 in which the synthetic polymeric material is polyvinyl chloride.

3. The composition of claim 1 in which the synthetic polymeric material is a copolymer of vinyl chloride and vinyl acetate.

4. The composition of claim 1 in which the caged boron-nitrogen compound is 3 - hydroxymethyl - 2,8,9-trioxa - 5 - aza - 1 - boratricyclo [3.3.3.0] undecane stearate.

5. The composition of claim 1 in which the polymeric material contains about 0.05 to 10% by weight of the caged boron-nitrogen compound.

6. The composition of claim 5 in which the polymeric material contains about 1 to 4% by weight of the caged boron-nitrogen compound.

7. The composition of claim 1 in which $x$, $y$ and $z$ are each 2 and the caged boron-nitrogen compound has the formula:

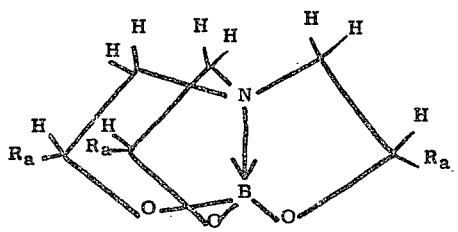

where each $R_a$ is a radical selected from the radicals listed in paragraphs (b) through (k) of claim 1, and is the same or different radicals.

8. The composition of claim 7 in which the caged boron-nitrogen compound is 3,7 - dihydroxymethyl - 10 - methyl - 2,8,9 - trioxa - 5 - aza - 1 - boratricyclo [3.3.3.0] undecane.

9. The composition of claim 7 in which the caged compound includes at least one hydroxy-substituted $C_1$ to $C_9$ lower alkyl radical.

10. The composition of claim 1 in which the caged boron-nitrogen compound is 8,11 - dihydroxymethyl - 2,9,10 - trioxa - 6 - aza - 1 - boratricyclo [4.3.3.0] dodecane.

11. The composition of claim 7 in which each $R_a$ is a $C_1$–$C_{16}$ alkyl radical, each of said substituents being the same or different radicals.

12. The composition of claim 7 in which the caged boron-nitrogen compound is 3,7,10 - trimethyl - 2,8,9 - trioxa - 5 - aza - 1 - boratricyclo [3.3.3.0] undecane.

13. The composition of claim 7 in which the polymeric material is polyvinyl chloride.

14. The composition of claim 7 in which the polymeric material is a copolymer of vinyl chloride and vinyl acetate.

15. The composition of claim 7 in which the caged boron-nitrogen compound is 3,7 - dimethyl - 10 - hydroxymethyl - 2,8,9-trioxa - 5 - aza - 1 - boratricyclo [3.3.3.0] undecane stearate.

References Cited

UNITED STATES PATENTS

| | | | |
|---|---|---|---|
| 2,871,454 | 1/1959 | Langer | 260—47 |
| 2,976,307 | 3/1961 | Rudner et al. | 260—448 |
| 3,103,531 | 9/1963 | Braman | 260—462 |
| 3,143,528 | 8/1964 | Finestone et al. | 260—78 |
| 3,203,929 | 8/1965 | Kitasaki et al. | 260—47 |
| 3,224,889 | 12/1965 | Bradford et al. | 260—45.9 |
| 3,341,474 | 9/1967 | Bradford et al. | 260—45.9 |
| 3,382,208 | 5/1968 | Cyba | 260—45.9 |
| 3,417,058 | 12/1968 | Strobel et al. | 260—75 |

OTHER REFERENCES

Brown et al., J.A.C.S., vol. 73 (1951), pp. 2808–2810.

DONALD E. CZAJA, Primary Examiner

R. A. WHITE, Assistant Examiner

U.S. Cl. X.R.

260—45.9, 75, 87.1, 92.8, 94.9, 398.5